United States Patent [19]

Zurawski et al.

[11] Patent Number: 5,263,144
[45] Date of Patent: Nov. 16, 1993

[54] METHOD AND APPARATUS FOR SHARING DATA BETWEEN PROCESSORS IN A COMPUTER SYSTEM

[75] Inventors: John H. Zurawski, Boxboro; Raj Ramanujan, Leominster; John De Rosa, Princeton, all of Mass.

[73] Assignee: Digital Equipment Corporation, Maynard, Mass.

[21] Appl. No.: 546,508

[22] Filed: Jun. 29, 1990

[51] Int. Cl.5 ............................................. G06F 13/14
[52] U.S. Cl. .................................. 395/425; 364/DIG. 1
[58] Field of Search ... 364/200 MS File, 900 MS File; 395/400 MS, 425 MS

[56] References Cited

U.S. PATENT DOCUMENTS

| | | | |
|---|---|---|---|
| 3,422,401 | 1/1969 | Luching | 340/172.5 |
| 3,510,844 | 5/1970 | Aranyi et al. | 340/172.5 |
| 3,735,360 | 5/1973 | Anderson et al. | 340/172.5 |
| 3,771,137 | 11/1973 | Barner et al. | 340/172.5 |
| 3,967,247 | 6/1976 | Anderson et al. | 340/172.5 |
| 4,136,386 | 1/1979 | Annunziata et al. | 395/425 |
| 4,195,342 | 3/1980 | Joyce et al. | 364/200 |
| 4,394,727 | 7/1983 | Hoffman et al. | 364/200 |
| 4,394,731 | 7/1983 | Flusche et al. | 364/200 |
| 4,442,487 | 4/1984 | Fletcher et al. | 364/200 |
| 4,471,429 | 9/1984 | Porter et al. | 364/200 |
| 4,527,238 | 7/1985 | Ryan et al. | 364/200 |
| 4,551,799 | 11/1985 | Ryan et al. | 364/200 |
| 4,594,658 | 6/1986 | Steckler | 364/200 |
| 4,622,631 | 11/1986 | Frank et al. | 364/200 |
| 4,654,819 | 3/1987 | Stiffler et al. | 364/900 |
| 4,695,951 | 9/1987 | Hooker et al. | 364/200 |
| 4,783,736 | 11/1988 | Ziegler et al. | 364/200 |
| 4,794,521 | 12/1988 | Ziegler et al. | 364/200 |
| 4,888,679 | 12/1989 | Fossum et al. | 364/200 |
| 4,995,041 | 2/1991 | Hetherington et al. | 395/425 |
| 5,091,846 | 2/1992 | Sachs et al. | 395/250 |
| 5,113,522 | 5/1992 | Dinwiddie, Jr. et al. | 395/700 |
| 5,136,619 | 8/1992 | Baror | 395/200 |

OTHER PUBLICATIONS

"Cache Memories" by Alan Jay Smith, Computing Surveys, vol. 14, No. 3, Sep. 1982.

Primary Examiner—Joseph L. Dixon
Assistant Examiner—Reba I. Elmore
Attorney, Agent, or Firm—Kenyon & Kenyon

[57] ABSTRACT

A cache coherency scheme in a multiprocessor computer system allows data sharing between caches at a fast rate. A new cache coherency state is introduced which allows a processor pair to more effectively share data and eliminate bus transfers thereby improving system throughput. The transfer of data is accomplished by the returning a portion of a preselected data block pursuant to either a read or a read for ownership request by a first one of the processors of the processor pair by the second processor of the processor pair. The ownership of the portion of the preselected data block is shared by the processor pair. Both processors set an indicator to denote that the preselected data block is an incomplete data block.

29 Claims, 3 Drawing Sheets

METHOD AND APPARATUS FOR SHARING DATA BETWEEN PROCESSORS IN A COMPUTER SYSTEM

FIELD OF THE INVENTION

The invention relates to a multiprocessor computer system and, more particularly, to a multiprocessor computer system wherein each of the central processing units in the system has a write-back cache memory. The invention provides a cache coherency scheme for utilization in a multiprocessor computer system.

BACKGROUND OF THE INVENTION

Modern day computer systems frequently comprise a central processing unit and a memory hierarchy including a relatively large, but relatively slow main memory module and a relatively small, but relatively fast cache memory coupled between the central processing unit and main memory module. Data and instructions currently being processed by the central processing unit are temporarily stored in the cache memory to take advantage of the high speed of operation of the cache memory to thereby increase the overall speed of operation of the central processing unit.

The use of a cache memory is based upon the principles of temporal locality and spatial locality. More specifically, when a central processing unit is referring to data and instructions from a particular space within physical memory, it will most probably refer to the data and instructions from that space, and also refer to data and instructions from contiguous space, for a certain period of time. Accordingly, data blocks including the contiguous space of physical memory where data being utilized by the central processing unit reside, are placed in the cache memory to greatly decrease the time required to fetch data and instructions from those frequently referred to data blocks.

A cache memory scheme may be either a write-through cache or a write-back cache. In a write-through cache, a central processing unit writes through to main memory whenever it writes to an address in cache memory. Such write to main memory may not be instantaneous when a cache memory scheme places buffers in the path between main memory and the write-through cache. In a write-back cache, the central processing unit does not update main memory at the time of writing to its cache memory but updates memory at a later time. Thus, a write-back cache speeds up the operation of the central processing unit because it minimizes writes to main memory. For example, when the central processing unit is changing the contents of its cache memory, it will send the latest copy of written-to data to main memory before it refills the space within the cache occupied by the written-to data. In this manner, the speed of operation of the central processing unit is not slowed down by the time that would be required to update main memory after each write operation. Instead, main memory is typically updated after a number of write operations have been performed on the data block contained in the cache memory.

Many computer systems operate on the basis of the concept of a single, simple copy of data. In a multiprocessor system including several central processing units, each with its own write-back cache, incoherencies within the data arise when one of the central processing units writes to a data block in its cache memory. These incoherencies result when a particular central processing unit writes to its cache memory thereby causing main memory to have a copy of the data which is not correct until the central processing unit updates main memory.

If a particular central processing unit requests a data block currently in the cache of another central processing unit of the multiprocessor system and that data block has been written to by some other central processing unit on a write-back basis, as described above, a coherency scheme must be utilized to ensure that the latest correct copy of the data is sent to the requesting central processing unit. Typically, multiprocessor systems have implemented a so-called "snoopy" protocol in a shared or point-to-point bus configuration for the several central processing units of the system to assure that the latest copy of a data block is sent to a requesting central processing unit.

In a point-to-point bus arrangement, all of the central processing units of the multiprocessor system are coupled to main memory through a central memory controller. Each of the caches of the several central processing units and any other devices coupled to the memory controller "snoop" on (i.e., watch or monitor) all transactions with main memory by all of the other caches. Thus, each cache is aware of all data blocks transferred from main memory to the several other caches throughout the multiprocessor system. Inasmuch as the caches are coupled to main memory by a single memory controller, it is necessary to implement an arbitration mechanism to grant access to one of possibly several devices requesting access to specific blocks of main memory at any particular time. The arbitration mechanism will effectively serialize transactions with main memory and the snoopy protocol utilizes the serialization to impose a rule that only one cache at a time has permission to modify a data block.

After modification of the data block in the one cache, main memory no longer contains a valid copy of the data until it is updated by the cache having the written to block, as described above. In accordance with the snoopy protocol, the copy of the written to data block in the one cache is substituted for the main memory copy whenever another cache requests that data block prior to the update of main memory. An ownership model of the snoopy protocol includes the concept of "ownership" of a data block. A device must first request and obtain ownership of a data block in its cache before it can write to that data block. Furthermore, in accordance with the ownership model, ownership of a data block must be given when ownership of the data block is requested. At most one device can own a data block at any one time and the owner always has the valid copy of that data block. The owner can update main memory before it relinquishes ownership of the block or it can transfer ownership from cache to cache without ever having to update main memory. In either situation, coherency is maintained since only one cache contains the valid data.

By definition, ownership means the right to modify a data block. When no system device owns a data block it is said to be owned by main memory and copies of the data block may be "shared" by any of the system devices. A shared mode means the device has read only access to a shared copy of a data block residing in its cache. Since main memory owns the data block in the shared mode, all shared copies exactly match the copy in main memory and are, hence, correct copies. Once any one device other than main memory obtains ownership of a data block, no other device may share the block and all copies of the data block which are shared are invalidated at the time ownership is obtained by the one device.

It is implicit above that main memory does not respond to a request if some cache owns the data—instead the cache that has ownership of the data will supply it. Typically, this is done by having each cache search itself for the data with each bus request. If a cache finds it owns the requested data, it suppresses main memory (which could otherwise respond), typically by transmitting a signal to the memory controller, and applies the data to the bus itself.

A major drawback to the foregoing cache coherency scheme arises in multiprocessor systems where processors are grouped together as processor pairs. A common example of a processor pair is a vector processor and scalar processor. The vector processor is a specialized processor that performs floating point operations at high speeds. Such vector processor is paired off with a scalar processor which performs the standard data manipulating and handling operations of a general purpose central processing unit.

Typically, the scalar/vector processor pair is utilized to speed up the execution of program instructions. For example, all instructions for executing a program would be processed by the scalar processor. Upon detecting a vector instruction, the scalar processor would pass the instruction to the vector processor for processing and either wait for the results or continue processing. In this situation, the processor pair typically will operate on the same data. Since the vector processor is the "data hungry" processor of the processor pair, the common data will most likely reside in its cache. There is a need, however, for sharing the data stored in its cache at various stages of program execution with its scalar partner.

Known multiprocessor systems have accomplished the sharing of data between a scalar/vector processor pair by forcing the requesting processor to initiate a bus transaction, i.e., a read for ownership, to fetch the data from main memory since it is unaware that its partner has the data in its cache. Upon detecting that the requested data resides in its cache, the other processor of the processor pair would transfer over the requested block. This results in a number of extra bus cycles which will reduce the system throughput. The foregoing example of a cache coherency scheme provides a effective scheme for maintaining data coherency throughout a multiprocessor system including devices having write-back caches. However, a major drawback of the scheme is that processor pairs which operate on common data must follow the same procedures for accessing data as other processors. Thus, the maximum speed of operation theoretically possible in a system having processor pairs is diminished in practical applications since each time one of the processors of the pair needs data that is stored in the other processor's cache, it must perform a read for ownership and wait to have the data sent from its processor pair partner. Moreover, the requesting processor may not require an entire block of data but must request it and thereby deprive its processing pair from operating on the remaining portion of the data block that was not needed.

SUMMARY OF THE INVENTION

Accordingly, the present invention provides a cache coherency scheme for sharing data between caches at a fast rate. This is accomplished by introducing a new cache coherency state referred to as an "incomplete" state which allows a processor pair to more effectively share data and eliminate bus transfers thereby improving system throughput.

The system of the present invention comprises a multiprocessor system with at least one processing pair, e.g., a vector/scalar pair. The processor pair is coupled by a private link. Each processor has a write-back cache memory. These cache memories are coupled to main memory by a point-to-point bus arrangement through a central memory controller. Furthermore, each cache memory has a tag store associated with it in which the processor tracks the state of the locations within the associated cache memory.

In processing highly vectorized programs, the vector processor will tend to operate on its data frequently whereas the scalar processor may occasionally require access to the block stored in the vector processor's cache for minor manipulation. Thus, there is a need for the vector processor to retain its data in its cache memory for as long as possible.

When the scalar processor requires data that is in its vector processor partner's cache, it performs either a read or a read for ownership operation on the bus. The scalar processor issues a read for ownership when it wishes to modify the data. Upon detecting that the read operation on the bus is for data that is in its cache in an "owned" state, the vector processor will proceed to send the data to the requesting processor. The vector processor determines if the request is from its scalar partner before it sends the data.

When the vector processor services the read or read for ownership request, it will only return a portion of a data block, e.g., a quad word (64 bits), instead of an entire data block, e.g., 64 bytes and a special command indicating that it is returning only a portion of a data block. The vector processor only sends a copy of the quad word to the scalar processor. The original quad word remains in the cache memory of the vector processor until the scalar processor performs a write operation on the portion of the data block. Such write operations will implicitly invalidate the original quad word in the cache memory of the vector processor. Such implicit invalidation means that any write to the quad word performed by the scalar processor will eventually replace the quad word or the portion of the quad word written in the cache of the vector processor. Thus, if the scalar processor never writes to the quad word it never needs to send the quad word back to the vector processor when the scalar processor wishes to discard the quad word.

After sending the quad word to the scalar processor, the vector processor updates its tag store to indicate that it has only partial ownership of the block from which the portion of the data block was taken. It also marks which quad word of the incomplete block was passed over to its scalar processor partner. The concept of partial ownership implies that the remaining quad words are treated as owned by the vector processor but the ownership of the quad word transferred to the scalar processor is shared with the scalar processor. Thus, this block is marked as an incomplete data block which means that the vector processor shares ownership of a portion of the data in this block with its scalar processor partner.

Upon receiving the data, the scalar processor will recognize that this data is from its vector processor partner's cache by the special command and since no other processor in the system would only send a portion of a data block. The scalar unit will store an indication in its tag store denoting that this received data is part of a incomplete data block to which it shares ownership with its vector processor partner.

If the scalar processor subsequently attempts to access a portion of the requested data block that was not sent to it by the vector processor, a cache miss occurs. Such cache miss will result in the scalar processor performing a second read or read for ownership operation on the bus for the missing data. The vector processor will send the complete data block to its scalar processor partner upon recognizing that the read or read for ownership command is directed to data in its cache that is part of an incomplete data block and the request is from its scalar processor. Thus, the vector processor will relinquish ownership and the scalar processor will obtain ownership of the block.

The vector processor may choose not to relinquish ownership of the block until the scalar has made more than a predefined number of read for ownership requests. Thus, the vector processor only sends a portion of the data requested by the scalar processor. In such situation, the scalar processor must continue to request the data until it exceeds the predefined number of read or read for ownership requests.

Returning to the situation of incomplete block ownership, the portion of the data block that the scalar processor has received from its vector processor pair need not be returned to the cache memory of the vector processor if the scalar processor has not written to a data block. The scalar processor will only discard the quad word from its cache memory when there is no room left for a new block.

The portion of the data block that the scalar processor has received from the vector processor is treated as a "write-through" block. This means that any write operations performed by the scalar processor to this portion of data will require the scalar processor to update the portion of the data in the cache memory of the vector processor. Such updating will occur when the write buffer eventually purges the data.

When the scalar processor performs a write operation on the portion of the data block, the portion is stored in the write buffer with an indication that it is part of an incomplete data block and must be returned to the vector processor. Thus, the data is stored in the write buffer but is not returned immediately to the vector processor.

One situation which would cause the data to be returned to the vector processor's cache is if the vector processor attempted to write to the portion of the data block that was sent to the scalar processor. When the vector processor requires the data block, it must perform a read for ownership on the bus. This would cause the scalar processor to search its tag store to determine if the request is directed to a data block that is in an incomplete state. Upon recognizing that the request is directed to an incomplete data block, if the scalar processor had written to the portion of the incomplete data block, it would purge the data stored in its write buffer across the private link to the vector processor's cache memory. If the scalar processor had not written to the portion of the incomplete data block, it would send an acknowledgement across the private link to the vector processor. In either case, the scalar processor invalidates the incomplete block state in its tag store. After the vector processor merges the purged data into its cache or receives an acknowledgement from the scalar processor, the vector processor updates its tag store to reflect that it now owns the block again.

Another situation which would cause the data to be returned to the vector processor's cache is where another processor in the system besides the vector/scalar pair wants to own or share the data block that is in an incomplete state. The vector and the scalar processors will recognize that the requested block is in an incomplete state by scanning their respective tag stores. If the scalar processor has written to the portion of the incomplete data block, it will purge the write buffer of any data which belongs to the current block to the vector processor for merging and invalidate its copy of the portion of the data block by invalidating the entry for that data block in its tag store. If the scalar processor had not written to the portion of the incomplete data block, it would send an acknowledgement across the private link to the vector processor and also invalidate its copy of the portion of the data block by invalidating the incomplete state in its tag store.

Upon receiving the portion of the data block, the vector processor manages the merging of the portion of the data block with the remainder of the data block stored in its cache memory. The vector processor then transfers the data block across the bus to the requesting CPU and then invalidates or puts its copy of the data block into a shared state depending upon if the other CPU issued a read or a read for ownership. The vector processor will not transfer the block until it gets the data purged to it from the scalar processor's write buffer or receives an acknowledgement across the private link that the scalar processor has not written to the portion of the incomplete data block.

Another instance where the portion of the data block stored in the write buffer of the scalar processor could get purged to the cache of the vector processor is where the scalar processor is doing a local write and requires the buffer space. This purging of the data from the write buffer of the scalar processor will occur even though the vector processor did not request the data.

Thus, the data could sit in the write buffer of the scalar processor for a long time until there is a snoopy hit for that block, i.e., another processor requests access to the data block via a read for ownership command on the bus, until the vector processor needs the data, when the scalar processor requires access to the remainder of the data block or when the scalar processor is performing local writes and needs the buffer space.

DETAILED DESCRIPTION

Figure 1:
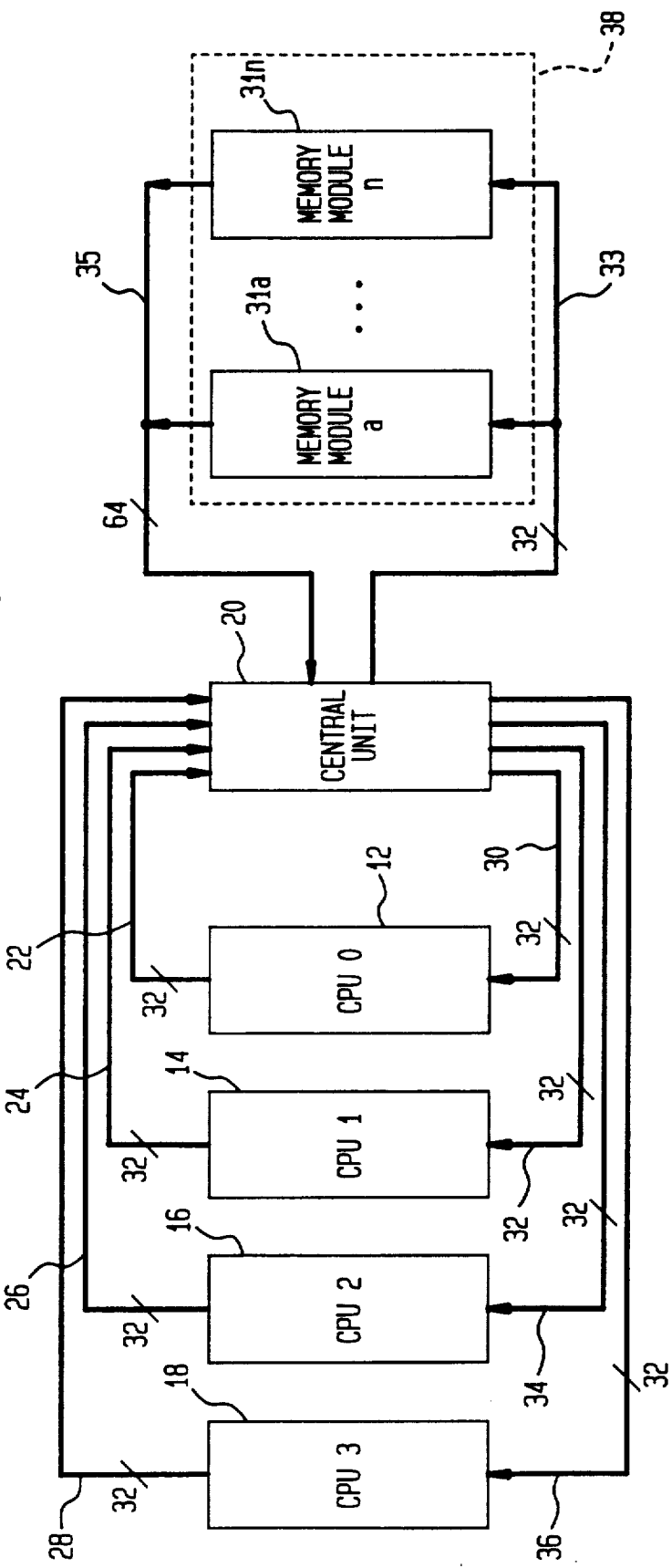
FIG. 1 is a block diagram of a preferred embodiment of the system of the present invention.

FIG. 1 is a block diagram of a system 10 according to the present invention. As illustrated, there are four central processing units, CPU 0, CPU 1, CPU 2 and CPU 3, indicated as blocks 12, 14, 16 and 18, respectively. These blocks are coupled to a central unit 20 which is described in more detail below. Each of the CPUs is connected to central unit 20 over a 32 bit wide point to point bus, hereinafter referred to as an E-BUS TA, the E-BUS TA for CPU 0 being designated as 22, 24 for CPU 1, 26 for CPU 2 and 28 for CPU 3. Each CPU receives an output from central unit 20 over a 32 bit wide point to point bus hereinafter referred to as E-BUS FA. The four E-BUS FA uni-directional buses for CPU 0 to CPU 3 are designated respectively, 30, 32, 34 and 36.

System 10 also includes main memory 38 which comprises a plurality of memory modules 31 up to 31n. The memory modules are coupled to central unit 20 over a 32 bit wide bus designated as A-BUS FA 33 on which outputs from central unit 20 are provided to the memory modules and a 64 bit wide bus designated as A-BUS TA 35 from which memory information is provided to the central unit 20.

The central unit 20 fulfills two basic functions. One is the combining of the input signals such that all inputs, which are of a point to point nature between the CPUs, the main memory 38 and the central unit 20, are provided as outputs on all of the output buses, e.g., 30, 32, 34, 36 and 33. The combining of the input signals is described in more detail in copending application Ser. No. 07/546,547 which is assigned to the assignee of the present invention and the disclosure of which is hereby expressly incorporated by reference. The central unit 20 also contains a memory controller for memory modules 31a . . . 31n. The memory controller and memory modules are described in more detail in copending application Ser. Nos. 07/445,983 and 07/445,994, both of which were filed Dec. 4, 1989, are assigned to the assignee of the present invention and the disclosures of which are hereby expressly incorporated by reference. The present application thus will not discuss the combining of the input signals or the memory control in any detail.

Figure 2:
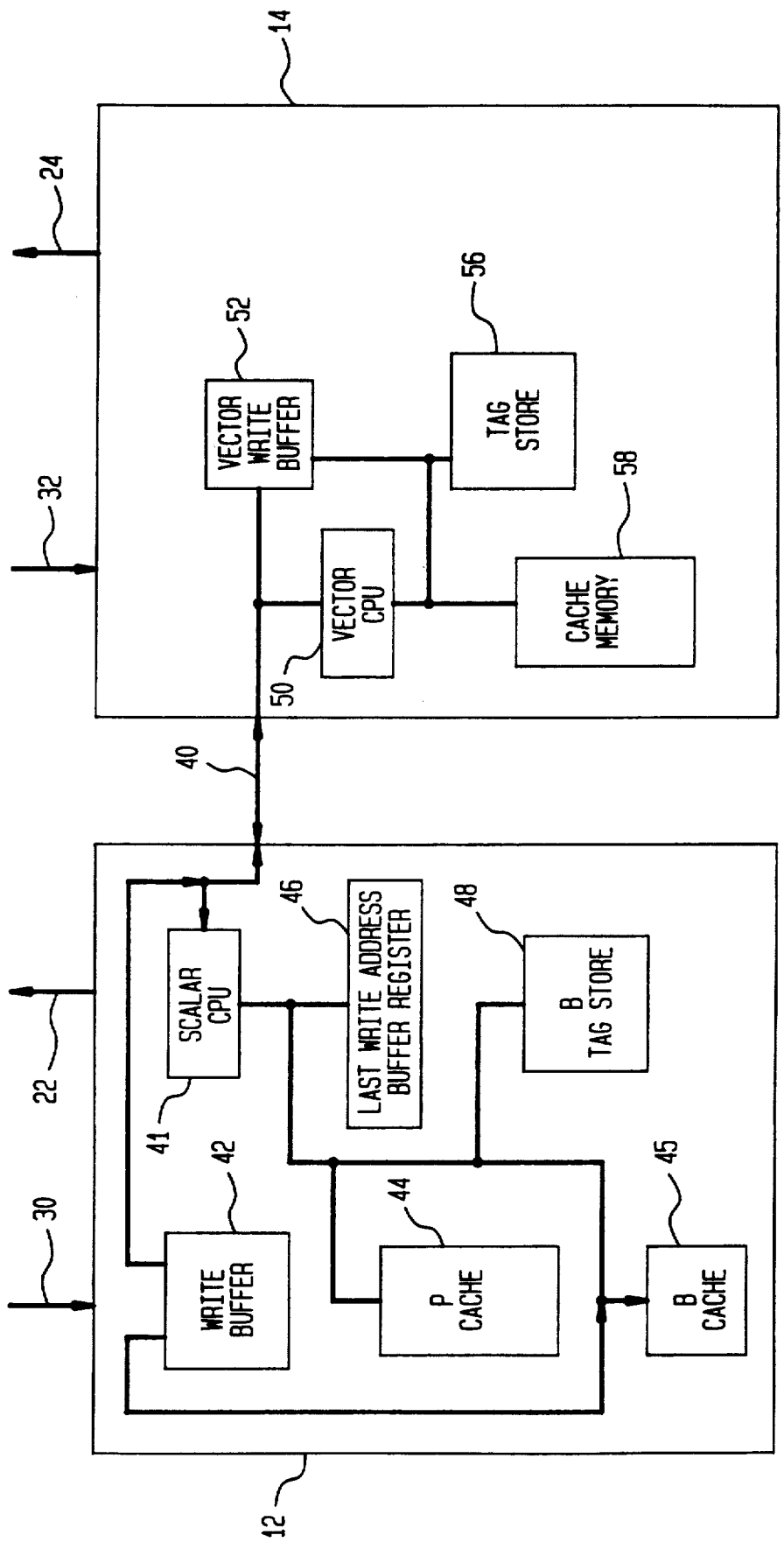
FIG. 2 is a more detailed block diagram of the system of the present invention.

FIG. 2 is a more detailed block diagram of CPU 0 12 and CPU 1 14 which for illustrative purposes are shown as a scalar processor/vector processor pair. CPU 0 12 and CPU 1 14 will hereinafter be referred to as scalar processor 12 and vector processor 14. Each of the processors' E-BUS TA and E-BUS FA bus connections are shown with the same numeric designation as in FIG. 1. In addition, a bus arrangement coupling the scalar processor 12 and the vector processor 14 designated as the VS-BUS 40 is shown.

The scalar processor 12 comprises a scalar central processing unit ("CPU") 41, a write buffer 42, a P cache memory 44, a B cache memory 45, a last write address buffer register 46 and a B tag store 48. The scalar CPU 41 is coupled to the VS-BUS 40, the write buffer 42, the P cache memory 44, the B cache memory 45, the last write address buffer register 46 and the B tag store 48. The write buffer 42 is also coupled to the B cache memory 45.

The vector processor 14 comprises a vector central processing unit ("CPU") 50, a vector write buffer 52, a tag store 56 and a cache memory 58. The vector CPU 50 is coupled to the vector write buffer 52, the tag store 56, the VS-BUS 40 and the cache memory 58. The vector write buffer 52 is also coupled to the VS-BUS 40. The tag store 56 includes an incomplete block bit which is used to identify entries in the cache 58 that are part of an incomplete block. Note that there is no limitation to the number of data blocks in the cache 58 that can be in the incomplete state. In addition, an index, i.e., a write through index, is stored in entries in the tag store 56 in a field normally used by the cache coherency states. This index indicates which portion of the incomplete data block was requested by the scalar processor 12. The vector write data buffer 52 is a four location buffer addressed with a pointer that points to free locations. The buffer 52 is used to hold the contents of the write buffer 42 of the scalar processor 12 whenever the write buffer 42 is purged, and the buffer 52 also holds the address of the incomplete data block to which the contents are destined.

The following is an example of a read operation where the scalar processor 12 requests data that is stored in the cache 58 of the vector processor 14. The following description accurately describes the situation where the scalar processor 12 issues either a read or a read for ownership requesting access to data stored in the cache 58 of the vector processor 14. The scalar processor 12 issues a read for ownership when it needs to modify the requested data, otherwise it issues a read.

To start the operation, the scalar processor 12 issues either a read or a read for ownership request on the E-BUS TA 22. The request comprises a memory address where the requested data is expected to be stored in the main memory 38 and an ID field to indicate the source, i.e., the scalar processor 12, of the request.

Upon receiving this request via the E-BUS FA 32, the vector processor 14 decodes the ID field and determines that the request came from its scalar processor 12 partner. The vector CPU 50 searches the tag store 56 to determine if the requested data is stored in the cache 58. Since the requested data is stored in the cache 58 and the corresponding entry in the tag store 56 indicates that the requested data is owned by the vector processor 14, the corresponding entry in the tag store 56 is changed to indicate it is now part of an "incomplete" data block. Also, the write through index which points to the portion of the data block sent to the scalar processor 12 is stored in the tag store 56. This write through index is saved in the tag store 56 entry in the bits normally used by the cache coherency field as will be described below.

The vector processor 14 sends a copy of a portion of the requested data, i.e., a quad word, to the scalar processor 12 across the E-BUS TA 24 with a REFILL_QW command. This command indicates that the requested read is being serviced by the scalar processor 12's vector processor 14 partner. The original quad word remains in the cache 58 of the vector processor 14 until the scalar processor 12 performs a write operation on the portion of the data block. Such write operation will implicitly invalidate the original quad word in the cache 58 of the vector processor 14. Such implicit invalidation means that any write to the quad word by the scalar processor 12 will eventually replace the quad word or the portion of the quad word stored in the cache 58 of the vector processor 14. Thus, if the scalar processor 12 never writes to the quad word it never needs to send the quad word back to the vector processor 14 when the scalar processor 12 wishes to discard the quad word.

Upon receiving the REFILL_QW command, the scalar processor 12 recognizes that the refill data has been sent by the vector processor 14. The scalar CPU 41 stores the quad word in the P cache 44 and updates the B tag store 48 to indicate that the new entry in the P cache 44 is part of an incomplete data block. Note that although the vector processor 14 and the scalar processor 12 both mark their blocks as "incomplete", their respective cache contents are different.

The following describes the operation of the scalar processor 12 and the vector processor 14 when the scalar processor 12 writes to the quad word stored in the cache 44 which is part of the incomplete block. For this example, it is assumed that this is the first write to this location. As a result, a write buffer miss will occur indicating that the data to be written is not resident in the write buffer 42 (it is stored in the cache 44). The new address is loaded into the last write address buffer register 46. Thus, the write data is written into a fresh location in the write buffer 42. Up to four long words can be stored in the write buffer 42, although the most likely situation would be a floating point long word-/quad word write.

The write buffer miss will induce the scalar CPU 41 to access the B tag store 48. The incomplete block bit in the B tag store 48 entry indicates that the write data in the write buffer 42 is destined for cache 58 in the vector processor 14. Thus, the write buffer 42 entry is marked with the incomplete data block bit to indicate the vector destination. The address used to access the tag store 48 is also saved with this write buffer 42 entry. This address is called the "vector tag index". The B tag store 48 and the tag store 56 are coincidentally the same size and, therefore, have the same index.

Figure 3:
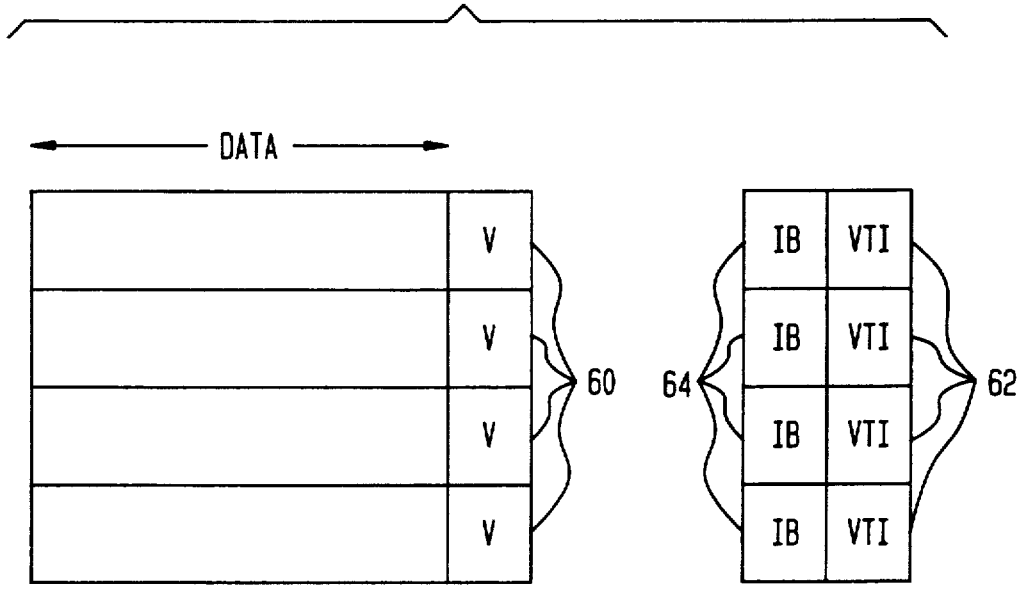
FIG. 3 is an illustration of the contents of the write buffer 42.

Referring now to FIG. 3, there is illustrated the structure of the write buffer 42. It can be seen that there are extra bits associated with each entry in the write buffer 42. These bits act as identifiers for each entry in the write buffer 42. The identifiers are grouped as four long word valid bits 60 ("V"), an N-bit vector tag index 62 ("VTI") where N is a function of cache and block size, and an incomplete data block bit 64 ("IB").

A subsequent write operation by the scalar processor 12 to the quad word operates as a normal write operation of updating the write buffer 42 and the P cache 44. Note that there may be numerous writes to the quad word of the incomplete block resident in the P cache 44 interspersed by writes to other blocks. These other writes would all result in write buffer 42 misses.

There are four situations which would cause the scalar processor 12 to purge the data stored in the write buffer 42 to the vector processor 14. These situations are (1) when the write buffer 42 becomes full, (2) when the scalar processor 12 requires access to the remainder of the incomplete block, (3) when a read command is issued by a processor other than the scalar/vector processor pair, and (4) when the vector processor 14 needs to write to the portion of the data block that was transferred to the scalar processor 12.

When the write buffer 42 becomes full, the old entries must be removed to make room for new entries. The incomplete data block bit will indicate whether the old entries are to be purged to the vector processor 14 across the VS-BUS 40 or to the B cache 45. The entries purged to the vector processor 14 include, in order, the vector-tag-index 62, the long word valid bits 60 associated with each entry and the entry itself. The valid bits 60 inform the vector CPU 50 which of the four long words are to be merged into the incomplete data block stored in cache 58. This purging operation is explained in greater detail below.

During the time that the scalar processor 12 has a quad word from an incomplete block stored in the P cache 44, there is the possibility that the scalar processor 12 may require access to the remainder of the incomplete block which is stored in the cache 58 in the vector processor 14. When such situation arises, a P cache 44 miss will occur which will cause the scalar CPU 41 to access the B tag store 48. Upon accessing the B tag store 48, the scalar CPU 41 will determine that the block is an incomplete data block. This will prompt the scalar processor 12 to post an E-BUS read request on the E-BUS TA 22.

The scalar CPU 41 also must search the write buffer 42 to determine if the quad word from the incomplete block stored in the P cache 44 has been updated. This search is performed by comparing the vector tag index and the incomplete bits associated with each location in the write buffer 42 with the B tag store 48 address and the incomplete bit stored in the B tag store 48. If a match occurs, then the data stored in the write buffer 42 must be merged with the incomplete block stored in the cache 58 of the vector processor 14. Thus, the data and associated identifiers are purged from the write buffer 42 to the vector processor 14 across the VS-BUS 40 immediately without waiting for an E-BUS grant indicating that the read request will be serviced. If no match occurs, the scalar CPU 41 will send an acknowledgement across the VS-BUS 40 to allow the vector processor 14 to complete the data transfer.

As described above, the scalar processor 12 sends the data from the write buffer 42 along with its associated incomplete block bit and the vector tag index across the VS-BUS 40 to the vector processor 14. The data sent across the VS-BUS 40 is stored in a free location in the vector write buffer 52 until the read request issued by the scalar processor 12 is received by the vector processor 14. If the vector write buffer 52 has no free locations, the vector CPU 50 sends a signal across the VS-BUS 40 to the scalar CPU 41 informing it to wait until a location in the vector write buffer 52 becomes free before purging the data in the write buffer 42.

Upon receiving the read request, the vector CPU 50 will check the tag store 56 and then indicate to the system that a cache hit has occurred. If so required, the data will then be fetched from the cache 58 and merged with the purged data stored in the vector write buffer 52. The complete block will then be transmitted across the E-BUS TA 24 to the scalar processor 12. If the vector processor 14 had data in the vector write buffer 52 to merge with the incomplete block from the cache 58, the vector processor 14 would relinquish ownership of the data block to the scalar processor 12. The vector processor 14 relinquishes ownership because it is assumed that if the scalar processor 12 has already written to the data once, it is likely to do so again. Otherwise, the data block is transferred to the scalar processor 12 as a shared data block.

The vector processor 14 will always wait for the scalar processor 12 to send any data stored in the write buffer 42 when it receives a read request from the scalar processor 12 or any other processor or module. Thus, even if there is no data stored in the write buffer 42, the scalar CPU 41 must send an acknowledgment across the VS-BUS 40 to allow the vector processor 14 to complete the data transfer.

The foregoing describes one situation where the quad word of an incomplete block is returned to the cache 58 of the vector processor 14. Another situation where the data will be returned is where a read request for the incomplete block is issued from a processor other than the scalar/vector processor pair, e.g., CPU 2 16. Such read request could be either a read or a read for ownership command.

Upon receiving the read request from CPU 2 16, the vector CPU 50 will check the tag store 56, determine that it owns the requested data and then indicate to the system that a cache hit has occurred. The scalar CPU 41 performs a similar check in the B tag store 48, determines that the requested data block is an incomplete data block and does not inform the system that a cache hit has occurred. The scalar CPU 41 checks the write buffer 42 concurrently by comparing the vector tag index and the incomplete bits, IB, associated with each location in the write buffer 42 with the address contained in the read request from CPU 2 16. If a match occurs, the data stored in the write buffer 42 must be merged with the incomplete block stored in the cache 58. The incomplete state of the incomplete block stored in the B tag store 48 is invalidated.

Either the data and associated identifiers stored in the write buffer 42 or an acknowledgment that there is no data in the write buffer 42, is sent to the vector processor 14 across the VS-BUS 40. If data is received, the data is merged with the incomplete block stored in the cache 58. After the merging operation is complete, the vector processor 14 will transmit the requested data block to CPU 2 16 across the E-BUS TA 24 and relinquish ownership of the block if ownership was requested. If ownership was not requested, i.e., CPU 2 16 issued a read command, the vector processor 14 will change the ownership of the requested block to shared.

Yet another situation where the data will be returned to the vector processor 14 from the scalar processor 12 is where the vector processor 14 wishes to read/write the incomplete data block. When such situation arises, the vector CPU 50 searches the tag store 56 to determine if the data needed is stored in the cache 58. Upon detecting that the required data is part of an incomplete data block, the vector CPU 50 will use the write through index stored in the tag entry in the tag store 56 to determine if the quad word which the vector processor 14 intends to write is stored in the scalar processor 12. If not, the vector processor 14 can safely access the data it wants because this portion of the incomplete block is stored in the cache 58. Otherwise, the vector processor 14 must access the latest version of the quad word passed to the scalar processor 12.

To obtain the latest version of the quad word, the vector processor 14 posts a read for ownership/no refill command on the E-BUS TA 24. This command is utilized regardless of the type of operation the vector processor 14 wishes to perform on the data.

Upon receiving this request, the scalar CPU 41 will immediately compare the address from the request with the vector tag indexes stored with their associated data in the write buffer 42. If a match results, the scalar CPU 41 will purge the data and associated identifiers across the VS-BUS 40 to the vector processor 14. The scalar CPU 41 will also check the B tag store 48 and the P cache 44, determine that the request is for an incomplete data block and invalidate any corresponding tag entry and data corresponding to the incomplete block stored in P cache 44 thereby ensuring that only one correct copy of the data block is in the system.

Upon receiving the purged data, the vector CPU 50 will merge the data with the remainder of the incomplete data block stored in the cache 58 and will change its tag to reflect that it now owns the entire data block.

The vector processor 14 is now ready to proceed with its read/write operation.

What is claimed is:

1. A computer system comprising:
   a plurality of processors having at least one processor pair, each one of the plurality of processors including a write-back cache for temporary storage of copies of preselected data blocks, the plurality of processors being coupled to each other by a bus;
   a plurality of selectively setable identifiers, each one of the plurality of selectively setable identifiers associated with a respective copy of the preselected data blocks stored in the write-back caches of the plurality of processors;
   each one of the plurality of selectively setable identifiers being selectively set to indicate an incomplete state of the copy of the preselected data blocks associated with said one of the plurality of selectively setable identifiers;
   a first processor of a processor pair of the plurality of processors transmits a read request on the bus when the first processor preselects a particular data block for temporarily storing a copy thereof in the write back cache of the first processor; and
   a second processor of the processor pair of the plurality of processors transmits a preselected portion of the particular data block requested by the first processor on the bus when the particular data block is stored in the write-back cache of the second processor in an owned state, thereby giving partial ownership of the portion of the particular data block to the first processor, and said second processor sets the one of the plurality of selectively setable identifiers associated with the particular data block to indicate the incomplete state of the particular data block.

2. The computer system according to claim 1 wherein the first processor further comprises a write buffer for temporary storage of the portion of the particular data block transmitted by the second processor after the portion of the particular data block has been modified by the first processor.

3. The computer system according to claim 1 wherein the first and second processors are coupled by a second bus and wherein the second processor further comprises a write buffer for temporary storage of the portion of the particular data block after the portion of the particular data block has been modified by the first processor and transmitted by the first processor across the second bus to the second processor.

4. The computer system of claim 3 wherein the second processor further comprises a device for merging the preselected portion of the particular data block modified by the first processor with a remainder of the particular data block stored in the write-back cache of the second processor, storing a merged data block in the write-back cache of the second processor and clearing the one of the plurality of selectively setable identifiers associated with the particular data block to clear the incomplete state.

5. The computer system according to claim 1 wherein the first and second processors of the plurality of processors are arranged to cooperate together to function as a processor pair.

6. The computer system according to claim 1 wherein the read request is a read command.

7. The computer system according to claim 1 wherein the read request is a read for ownership command.

8. A computer system comprising:
- a plurality of processors having at least one processor pair, each of one of the plurality of processors including a write-back cache for temporary storing of copies of preselected data blocks, the plurality of processors being coupled to each other by a first bus;
- a central memory control mechanism;
- each one of the plurality of processors being coupled by the first bus to the central memory control mechanism;
- the central memory control mechanism being coupled to a main memory module by a second bus, the main memory module stores data;
- a plurality of selectively setable identifiers, each one of the plurality of selectively setable identifiers associated with a respective copy of the preselected data blocks stored in the write-back caches of the plurality of processors;
- each one of the plurality of selectively setable identifiers being selectively set to indicate a block incomplete state of the copy of the preselected data blocks associated with said one of the plurality of selectively setable identifiers;
- a first processor of a processor pair of the plurality of processors transmits a read request on the first bus when the first processor preselects a particular data block for temporary storing a copy thereof in the write back cache of the first processor in an owned state; and
- a second processor of the processor pair of the plurality of processors transmits a preselected portion of the particular data block requested by the first processor on the first bus when the particular data block is stored in the write-back cache of the second processor in the owned state, thereby giving partial ownership to the portion of the particular data block to the first processor, and said second processor sets the one of the plurality of selectively setable identifiers associated with the particular data block to indicate the block incomplete state of the particular data block.

9. The computer system according to claim 8 wherein the first processor further comprises a write buffer for temporary storage of the portion of the particular data block transmitted by the second processor after the portion of the particular data block has been modified by the first processor.

10. The computer system according to claim 8 wherein the first and second processors are coupled by a second bus and wherein the second processor further comprises a write buffer for temporary storage of the portion of the particular data block after the portion of the particular data block has been modified by the first processor and transmitted by the first processor across the second bus to the second processor.

11. The computer system of claim 10 wherein the second processor further comprises a device for merging the preselected portion of the particular data block modified by the first processor with a remainder of the particular data block stored in the write-back cache of the second processor, storing a merged data block in the writeback cache of the second processor and clearing the one of the plurality of selectively setable identifiers associated with the particular data block to clear the incomplete state.

12. The computer system according to claim 8 wherein the first and second processors of the plurality of processors are arranged to cooperate together to function as a processor pair.

13. The computer system according to claim 8 wherein the read request is a read command.

14. The computer system according to claim 8 wherein the read request is a read for ownership command.

15. A method for maintaining data coherency in a computer system including a plurality of processors, each one of the plurality of processors including a write-back cache, the plurality of processors being coupled to each other by a first bus, a first and second processor of the plurality of processors being grouped together to form a processor pair, coupled by a second bus, the method comprising the steps of:

(a) temporarily storing copies of preselected data blocks in certain ones of the write-back caches;
(b) operating the first processor to transmit a read request on the first bus requesting access to a preselected data block;
(c) operating the second processor to process the read request in the second processor to determine if the preselected data block is stored in the write-back cache of the second processor in an owned state; and
(d) when the preselected data block is stored in the write-back cache of the second processor in an owned state,
  (i) operating the second processor to set an incomplete data block identifier for the preselected data block stored in the write-back cache of the second processor,
  (ii) operating the second processor to transmit a preselected portion of the preselected data block to the first processor giving the first processor partial ownership of the preselected portion of the preselected data block stored in the write-back cache of the second processor; and
  (iii) operating the second processor to set a second identifier to mark the preselected portion of the preselected data block stored in the write-back cache of the second processor that was transmitted to the first processor.

16. The method of claim 15 wherein the first processor requires access to the preselected data block further comprising the steps of:

(a) operating the first processor to receive the preselected portion of the preselected data block transmitted from the second processor;
(b) operating the first processor to detect that the preselected portion of the preselected data block was transmitted by the second processor;
(c) operating the first processor to set an incomplete data block identifier for the preselected portion of the preselected data block it received from the second processor; and
(d) operating the first processor to store the preselected portion of the preselected data block in the write-back cache of the first processor.

17. The method of claim 15 wherein the first processor requires access to a remainder of the preselected data block, further comprising the steps of:

(a) operating the first processor to transmit a second read request on the first bus requesting the preselected data block;
(b) operating the first processor and the second processor to determine if the preselected portion of the preselected data block has been modified by the first processor;

(c) when the preselected portion of the preselected data block has not been modified by the first processor, operating the first processor to transmit a status signal on the second bus to the second processor to inform the second processor that the preselected portion of the preselected data block has not been updated;

(d) operating the second processor to process the second read request in the second processor to determine if the preselected data block is stored in the write-back cache of the second processor;

(e) operating the second processor to clear the incomplete data block identifier for the preselected data block; and (f) operating the second processor to transmit the preselected data block on the first bus to the first processor.

18. The method of claim 15 wherein the first processor requires access to a remainder of the preselected data block, further comprising the steps of:

(a) operating the first processor to transmit a second read request on the first bus requesting the preselected data block;

(b) operating the first processor and the second processor to determine if the preselected portion of the preselected data block has been modified by the first processor;

(c) when the preselected portion of the preselected data block has been modified by the first processor, operating the first processor to transmit the modified preselected portion of the preselected data block on the second bus to the second processor;

(d) operating the second processor to merge the preselected portion of the preselected data block received from the first processor with the remainder of the preselected data block stored in the write-back cache of the second processor;

(e) operating the second processor to process the second read request in the second processor to determine if the preselected data block is stored in the write-back cache of the second processor;

(f) operating the second processor to clear the incomplete data block identifier for the preselected data block; and (g) operating the second processor to transmit the preselected data block on the first bus to the first processor and operating the second processor to relinquish ownership of the preselected data block to the first processor.

19. The method of claim 15 wherein a third processor of the plurality of processors requires access to the preselected data block, further comprising the steps of:

(a) operating the third processor to transmit a read for ownership request on the first bus requesting ownership of the preselected data block;

(b) operating the first processor and the second processor to identify that the preselected portion of the preselected data block is stored in the write-back cache of the first processor and the preselected data block is stored in the write-back cache of the second processor as an incomplete data block;

(c) operating the first processor and the second processor to determine if the preselected portion of the preselected data block has been modified by the first processor;

(d) when the preselected portion of the preselected data block has not been modified by the first processor, operating the first processor to transmit a status signal on the second bus to the second processor to inform the second processor that the preselected portion of the preselected data block has not been updated;

(e) operating the second processor to clear the incomplete data block identifier for the preselected data block; and (f) operating the second processor to transmit the preselected data block on the first bus from the second processor to the third processor and operating the second processor to relinquish ownership of the preselected data block to the third processor.

20. The method of claim 15 wherein a third processor of the plurality of processors requires access to the preselected data block, further comprising the steps of:

(a) operating the third processor to transmit a read for ownership request on the first bus requesting ownership of the preselected data block;

(b) operating the first processor and the second processor to determine that the preselected portion of the preselected data block is stored in the write-back cache of the first processor and the preselected data block is stored in the write-back cache of the second processor as an incomplete data block;

(c) operating the first processor and the second processor to determine if the preselected portion of the preselected data block has been modified by the first processor;

(d) when the preselected portion of the preselected data block has been modified by the first processor, operating the first processor to transmit the preselected portion of the preselected data block on the second bus to the second processor;

(e) operating the second processor to merge the preselected portion of the preselected data block received from the first processor with a remainder of the preselected data block stored in the write-back cache of the second processor;

(f) operating the second processor to clear the incomplete data block identifier for the preselected data block; and (g) operating the second processor to transmit the preselected data block on the first bus from the second processor to the third processor and operating the second processor to relinquish ownership of the preselected data block to the third processor.

21. The method of claim 15 wherein a third processor of the plurality of processors requires access to the preselected data block, further comprising the steps of:

(a) operating the third processor to transmit a read request on the first bus from the third processor requesting the preselected data block;

(b) operating the first processor and the second processor to determine that the preselected portion of the preselected data block is stored in the write-back cache of the first processor and the preselected data block is stored in the write-back cache of the second processor as an incomplete data block;

(c) operating the first processor and the second processor to determine if the preselected portion of the preselected data block has been modified by the first processor;

(d) when the preselected portion of the preselected data block has not been modified by the first processor, operating the first processor to transmit a status signal on the second bus to the second processor to inform the second processor that the preselected portion of the preselected data block has not been updated;

(e) operating the second processor to clear the incomplete data block identifier for the preselected data block; and (f) operating the second processor to transmit the preselected data block on the first bus from the second processor to the third processor and operating the second processor to share ownership of the preselected data block with the third processor.

22. The method of claim 15 wherein a third processor of the plurality of processors requires access to the preselected data block, further comprising the steps of:

(a) operating the third processor to transmit a read request on the first bus requesting the preselected data block;

(b) operating the first processor and the second processor to identify that the preselected portion of the preselected data block is stored in the write-back cache of the first processor and the preselected data block is stored in the write-back cache of the second processor as an incomplete data block;

(c) operating the first processor and the second processor to determine if the preselected portion of the preselected data block has been modified by the first processor;

(d) when the preselected portion of the preselected data block has been modified by the first processor, operating the first processor to transmit the preselected portion of the preselected data block on the second bus to the second processor;

(e) operating the second processor to merge the preselected portion of the preselected data block received from the first processor with a remainder of the preselected data block stored in the write-back cache of the second processor;

(f) operating the second processor to clear the incomplete data block identifier for the preselected data block; and (g) operating the second processor to transmit the preselected data block on the first bus from the second processor to the third processor and operating the second processor to share ownership of the preselected data block to the third processor.

23. The method of claim 15 wherein the step of operating the first processor to transmit a read request comprises operating the first processor to transmit a read command.

24. The method of claim 15 wherein the step of operating the first processor to transmit a read request comprises operating the first processor to transmit a read for ownership command.

25. The method of any one of claims 17 or 18, wherein the step of operating the first processor to transmit a second read request comprises operating the first processor to transmit a read command and the step of operating the second processor to process the second read request comprises operating the second processor to process the read command.

26. The method of any one of claims 17 or 18, wherein the step of operating the first processor to transmit a second read request comprises operating the first processor to transmit a read for ownership command and the step of operating the second processor to process the second read request comprises operating the second processor to process the read for ownership command.

27. The method of claim 15 wherein after the substep of operating the second processor to set a second identifier, the method further comprising the steps of:

(a) operating the second processor to determine that it requires access to the preselected data block;

(b) operating the second processor to determine if the preselected data block is stored in the write-back cache of the second processor;

(c) upon determining that the preselected data block is stored in the write-back cache of the second processor, operating the second processor to determine if the preselected data block is part of an incomplete data block;

(d) upon determining that the preselected data block is part of an incomplete data block, operating the second processor to determine if data in the preselected data block required by the second processor is stored in the write-back cache of the second processor; and (e) upon determining that the data in the preselected data block required by the second processor is stored in the write-back cache of the second processor, operating the second processor to access the preselected data block.

28. The method of claim 15 wherein after the substep of operating the second processor to set a second identifier, the method further comprising the steps of:

(a) operating the second processor to determine that it requires access to the preselected data block;

(b) operating the second processor to determine if the preselected data block is stored in the write-back cache of the second processor;

(c) upon determining that the preselected data block is stored in the write-back cache of the second processor, operating the second processor to determine if the preselected data block is part of an incomplete data block;

(d) upon determining that the preselected data block is part of an incomplete data block, operating the second processor to determine if data in the preselected data block required by the second processor is stored in the write-back cache of the second processor;

(e) upon determining that the data in the preselected data block required by the second processor is not stored in the write-back cache of the second processor, operating the second processor to transmit a read request on the first bus requesting the preselected data block; operating the first processor to determine if the preselected portion of the preselected data block has been modified by the first processor;

(f) operating the first processor to determine if the preselected portion of the preselected data block has been modified by the first processor;

(g) when the preselected portion of the preselected data block has not been modified by the first processor, operating the first processor to transmit a status signal on the second bus to the second processor to inform the second processor that the preselected portion of the preselected data block has not been updated;

(h) operating the first processor to invalidate the incomplete data block identifier in the first processor for the preselected portion of the preselected data block stored in the write-back cache of the first processor; and
(i) operating the second processor to invalidate the incomplete data block identifier in the second processor for the preselected data block stored in the write-back cache of the second processor.

29. The method of claim 15 wherein after the substep of operating the second processor to set a second identifier, the method further comprising the steps of:
(a) operating the second processor to determine that it requires access to the preselected data block;
(b) operating the second processor to determine if the preselected data block is stored in the write-back cache of the second processor;
(c) upon determining that the preselected data block is stored in the write-back cache of the second processor, operating the second processor to determine if the preselected data block is part of an incomplete data block;
(d) upon determining that the preselected data block is part of an incomplete data block, operating the second processor to determine if data in the preselected data block required by the second processor is stored in the write-back cache of the second processor;
(e) upon determining that the data in the preselected data block required by the second processor is not stored in the write-back cache of the second processor, operating the second processor to transmit a read request on the first bus requesting the preselected data block;
(f) operating the first processor to determine if the preselected portion of the preselected data block has been modified by the first processor;
(g) when the preselected portion of the preselected data block has been modified by the first processor, operating the first processor to transmit the preselected portion of the preselected data block on the second bus to the second processor;
(h) operating the second processor to merge the preselected portion of the preselected data block received from the first processor with the remainder of the preselected data block stored in the write-back cache of the second processor;
(i) operating the second processor to store a merged preselected data block in the write-back cache of the second processor; and
(j) operating the first processor to invalidate the incomplete data block identifier in the first processor for the preselected portion of the preselected data block stored in the write-back cache of the first processor and
(k) operating the second processor to invalidate the incomplete data block identifier in the second processor for the preselected data block stored in the write-back cache of the second processor.

* * * * *